Sept. 4, 1956 A. E. NOEL 2,761,702
NO THREAD PIPE COUPLING
Filed Feb. 21, 1951 2 Sheets-Sheet 1

INVENTOR
ARTHUR E. NOEL

BY

ATTORNEYS

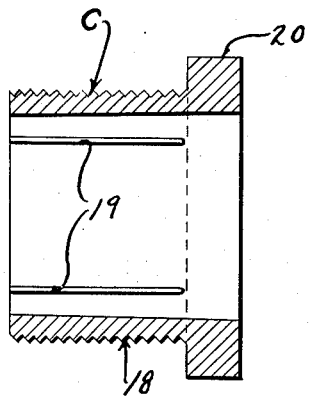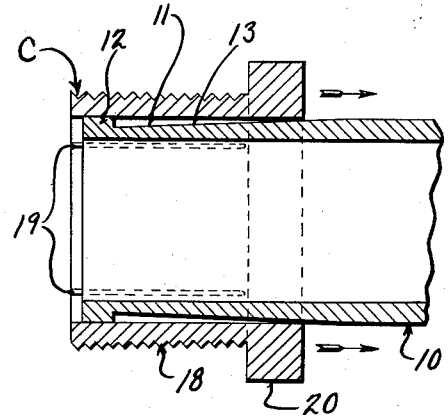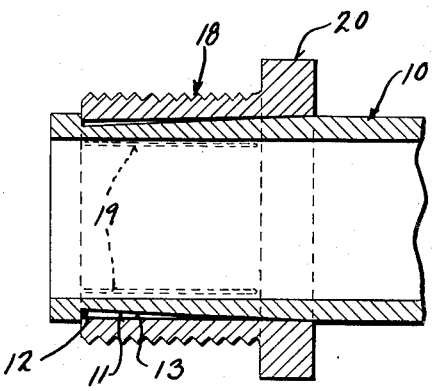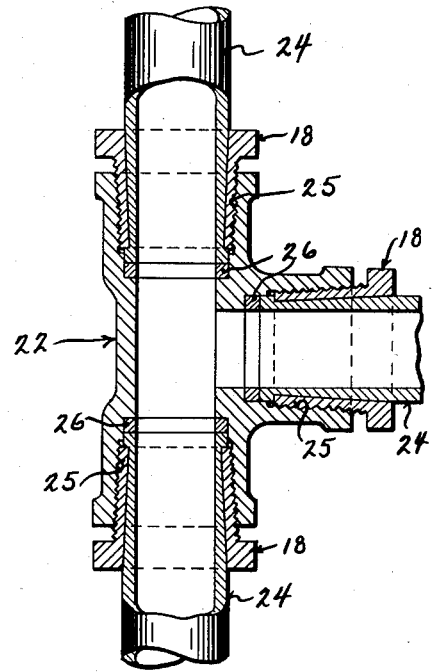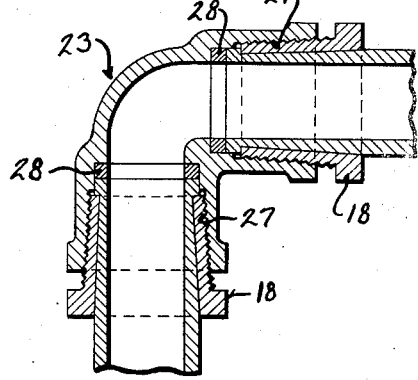

United States Patent Office 2,761,702
Patented Sept. 4, 1956

2,761,702

NO THREAD PIPE COUPLING

Arthur E. Noel, Milwaukee, Wis.

Application February 21, 1951, Serial No. 212,033

1 Claim. (Cl. 285—323)

This invention appertains to plumbing, and more particularly to a novel coupling for liquid and gas conducting pipes.

One of the primary objects of my invention, is the provision of a novel pipe coupling, in which the threading of pipe ends is eliminated, and in which the pipe ends are drawn into intimate engagement with a metal sealing ring or gasket, the entire construction being such that a non-rusting coupling is had in which the internal diameter of the coupling is not diminished in size and is of a size the same as the interior diameter of the pipe being coupled.

A further salient object of my invention is the provision of a pipe coupling in which the pipe ends are provided with annular tapered grooves defining seats and abutment stop shoulders over which split clamping nuts are sprung, the split nut on each pipe end being threaded into the tapered ends of a coupling sleeve for drawing the nuts, and consequently the pipe ends, toward one another, and in tight and sealing engagement with the sealing ring.

Another important object of my invention is the provision of novel means for forming the coupling sleeve, whereby the sleeve will snugly engage the periphery of the sealing ring to center the ring relative to the pipe ends and to prevent movement of the ring radially of the pipe ends.

A still further object of my invention is to provide a novel means for coupling pipe ends together and pipes to elbow and T-joints and the like, which will be durable and efficient in use, and one that will be simple, easy and inexpensive to manufacture.

With these and other objects in view, the invention consists in the novel construction, arrangement and formation of parts, as will be hereinafter more specifically described and claimed, and illustrated in the accompanying drawings, in which drawings, Figure 1 is a side elevational view of my novel coupling showing the same connecting a pair of pipe ends together.

Figure 4 is a detail longitudinal sectional view through one of the split nuts.

Figure 5 is a view similar to Figure 4, and showing the nut being pulled over a pipe end.

Figure 6 is a view similar to Figure 5, showing the nut in position on a pipe end and ready for connection with a coupling sleeve or other fitting.

Figure 7 is a longitudinal sectional view showing my invention utilized in connection with a T-joint or fitting.

Figure 8 is a longitudinal sectional view, showing my coupling utilized with an elbow joint or fitting.

Figure 1:
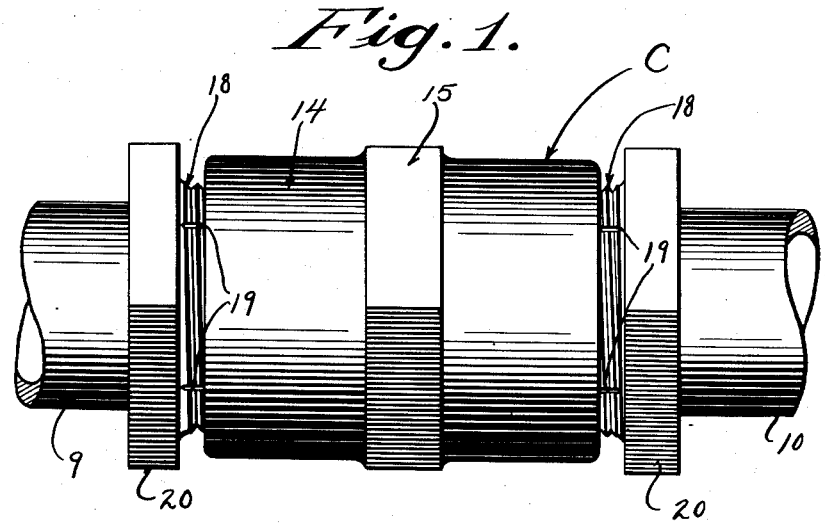

Referring to the drawings in detail, wherein similar reference characters designate corresponding parts throughout the several views, the letter C generally indicates my improved coupling for connecting a pair of pipe ends 9 and 10 together.

In accordance with my invention, each pipe end is provided with an annular, tapered groove 11, defining an abrupt shoulder 12 and a tapered seat 13, leading toward the abrupt shoulder.

The coupling C includes a coupling sleeve 14, a portion of the outer face of which is provided with a wrench engaging surface 15. The opposite ends of the coupling sleeve 14, are provided with internal threads 16, tapered toward the central portion of the sleeve, and the central portion of the sleeve is provided with a smooth, annular rib 17, of substantially the same diameter as the exterior diameter of the pipe to be coupled. In conjunction with the sleeve 14, I utilize nuts 18. These nuts are exteriorly threaded and are preferably provided at quarters with longitudinal slits 19, whereby the nuts can be contracted about the pipe, as will be later set forth. Each nut 18, at its outer end is provided with a wrench engaging face 20, whereby the same can be readily turned.

Figure 2:
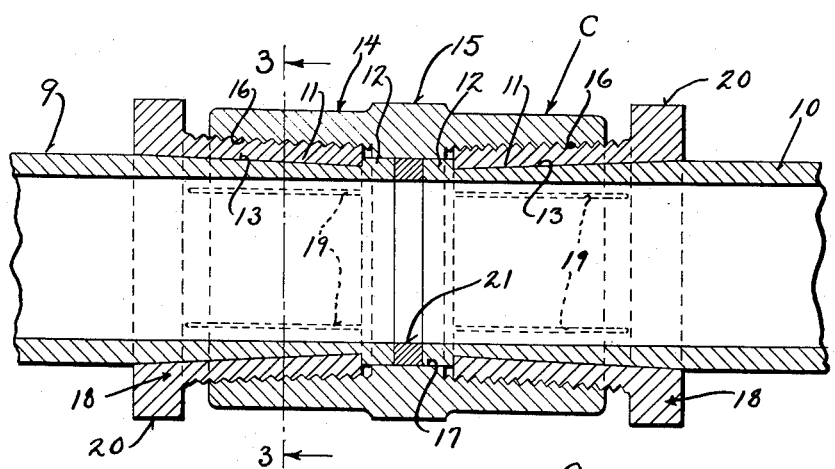
Figure 2 is a longitudinal sectional view taken on the line 2—2 of Figure 3, looking in the direction of the arrows, with a pair of pipe ends drawn into sealing engagement.
Figure 3:
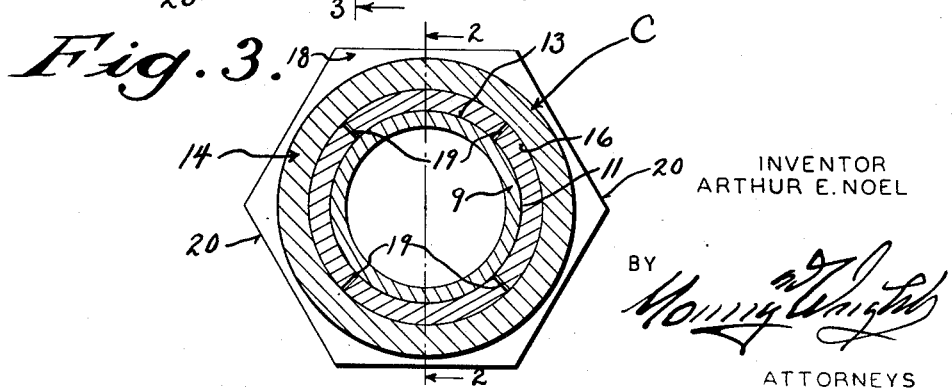
Figure 3 is a transverse sectional view through the coupling taken on the line 3—3 of Figure 2, looking in the direction of the arrows.

In use of my improved, novel coupling, a nut 18 is sprung over a pipe end, see Figure 5, until the same rides past the abrupt shoulder 12 of the annular groove 11 at which time the nut will spring into the groove, see Figure 6. Where pipes are to be connected, see Figure 2, the nuts 18 on the pipes are threaded into the opposite ends of the coupling sleeve 14, and just prior to this a metal sealing ring 21, is placed between the pipe ends. Upon the threading of the nuts into the coupling sleeve, the tapered threaded bores of the sleeve will tightly contract the nuts into firm, gripping contact with the pipe ends in the grooves and the pipe ends will be drawn toward one another into tight intimate engagement with the sealing ring 21. This forms a fluid tight joint and escape of fluid from the pipe into the coupling sleeve 14 and nuts 18, is prevented. By providing the tapered grooves 11, a positive seat is provided for the nuts and the nuts can be compressed into the seats and around the pipe, so that the pipe can be bodily moved without slippage in the coupling sleeve.

While my coupling is particularly useful for connecting pipe ends together, obviously, the same can be utilized for connecting pipes to a T-coupling or fitting 22, as shown in Figure 7, or an elbow coupling or fitting 23, as shown in Figure 8.

Now referring to Figure 7, the pipes 24 to be connected to the T-coupling or fitting 22, are treated in the same manner as the pipes 9 and 10, and receive the split nuts 18. The branches of the T-fitting 22 and are provided with internally threaded, tapered bores 25 and the nuts on the pipe 24 are threaded into the bores. Metal rings 26, are utilized and are placed in the bores of the T-fitting and the pipes are drawn into sealing engagement with the rings.

In Figure 8, the branches of the elbow fitting 23, are provided with internally threaded, tapered bores 27, in which the split nuts 18 are threaded. Metal sealing washers 28 are placed in the bores of the branches and the pipe is brought into engagement with these washers.

From the foregoing, it can be seen that I have provided an exceptionally simple and durable form of pipe coupling in which the threading of the pipe is eliminated and in which a tight seal is assured.

Changes in details may be made without departing from the spirit or the scope of this invention, but what I claim as new is:

A pipe coupling comprising a sleeve having an intermediate annular rib provided with a smooth inner face and said sleeve having its opposite ends provided with inwardly threaded bores tapering toward said rib, pipe ends received in said bores, a sealing ring fitted between said pipe ends in and centered by said rib, each of said pipe ends having an annular tapered seat terminating in an abrupt shoulder, the pipe ends forwardly of said shoulders being snugly received within the rib, one-piece nuts having their forward ends only split longitudinally defining resilient fingers sprung over said pipe ends into said seats and said nuts being threaded into the tapered bores for contracting the split portions of the nuts in said seats and for drawing the pipe ends into tight engagement with the sealing ring.

References Cited in the file of this patent

UNITED STATES PATENTS

| | | |
|---|---|---|
| 701,019 | Diescher | May 27, 1902 |
| 1,370,289 | Cripen | Mar. 1, 1921 |
| 1,567,324 | Jurs | Dec. 29, 1925 |
| 2,251,717 | Parker | Aug. 5, 1941 |
| 2,294,160 | Crane | Aug. 25, 1942 |
| 2,452,219 | Bergvall | Oct. 26, 1948 |
| 2,465,197 | Chatham | Mar. 22, 1949 |
| 2,503,094 | Buchanan | Apr. 4, 1950 |